United States Patent Office 2,838,425
Patented June 10, 1958

2,838,425

METHOD OF PROTECTING CELLULOSE FIBERS AGAINST MICROORGANISMS AND FUNGI AND THE RESULTING PRODUCT

Karl Lutz, Basel, and Hans Hemmi, Binningen, near Basel, Switzerland, assignors, by mesne assignments, to Saul & Co., Newark, N. J., as nominee of Fidelity Union Trust Company, executive trustee under Sandoz Trust No Drawing. Application November 23, 1953
Serial No. 393,932

Claims priority, application Switzerland
November 25, 1952

6 Claims. (Cl. 117—138.5)

The present invention is concerned with cellulose fibers which are protected against microorganisms and fungi, and with a process for achieving such protection.

Briefly stated, the protection which it is the object of the invention to realize, is obtained by producing on the fibers an impregnation which consists of a salt-like or complex compound of polymeric nitrogen compounds which have an affinity for the fibers and of a phenol.

Cellulose fibers, in the sense of the present invention, comprise natural and regenerated cellulose fibers, and also those fibers which, with respect to affinity for the polymeric nitrogen compounds, behave like cellulose fibers.

Particularly suitable polymeric nitrogen compounds which have affinity for the said fibers are, for example, those which are known, in connection with substantive dyeings, as improvers of fastness to wet treatments. These comprise, for example, the condensation products obtainable by the reaction between cyanamide or dicyandiamide and formaldehyde or paraformaldehyde, optionally in the presence of soluble salts, e. g. hydrochlorides, of basic nitrogen compounds. They also comprise the condensation products obtainable from cyanamide or its polymers, such as dicyandiamide, and polyalkylenepolyamines, such as diethylenetriamine, triethylenetetramine, tetraethylenepentamine and polyethylenepolyamines boiling above 190° under a pressure of 15 mm. mercury gauge or the hydrochlorides of these amines, by heating and splitting off of ammonia; these condensation products may if necessary be further reacted with formaldehyde or paraformaldehyde or alkylating or aralkylating agents.

The desired effects are achieved, for example, by carrying out the impregnation of the fibrous materials with solutions or aqueous dispersions which contain the polymeric nitrogen compounds and the fungicidally or bactericidally acting phenols bound to each other in the most closely possible manner. It is advantageous, in this regard, to prepare the salts or complex compounds of the polymeric nitrogen compounds just prior to use, and to apply them to the fibers suitably dispersed in water. The molar ratio between the polymeric nitrogen compound and the phenol is advantageously one molecule of monovalent phenol to one basic nitrogen atom of the polymeric nitrogen compound. This ratio is generally found in the precipitates which are obtained according to the following examples. The precipitates are not or only sparingly soluble in water and must, therefore, be dispersed therein by known methods.

Impregnations produced according to the present invention are characterized by the great advantage of being fast to rinsing and even to washing and, because of their affinity for the fiber, of being able to draw onto the latter from the treating baths.

The following examples illustrate the invention without, however, being restrictive thereof. In these examples, the parts and percentages (unless otherwise indicated) are by weight, and the temperatures are in degrees centigrade. The relationship between part by weight and part by volume is the same as that between kilogram and liter.

*Example 1*

A solution of 21 parts of chloro-o-cyclohexyl-phenol in 40 parts by volume of acetone is added dropwise at 50–60° and while stirring to a 10% aqueous solution of 16 parts of a polymeric nitrogen compound, obtained by condensing 103 parts of diethylenetriamine and 84 parts of dicyandiamide for five hours at 155–160°. Upon completion of the dropwise addition, stirring is continued for an additional half hour at 50–60°, after which the precipitated resinous reaction product is separated from the water and is dried at 60° under reduced pressure. 2.2 parts of the so-obtained reaction product are dissolved in 60 parts by volume of ethyl alcohol and then diluted to 1000 parts by volume with water at 60°, whereupon a milky emulsion is formed. A cotton fabric—impregnated with this emulsion for 20 minutes at 60–70° (bath ratio 1:50) and then rinsed and dried—is endowed with mildew-proof properties which are retained even after washing and after rinsing for hours.

*Example 2*

16 parts of the polymeric nitrogen compound, prepared according to Example 1, are dissolved in 150 parts by volume of water and then stirred at 50–55° with 12 parts of benzyl chloride until the pH of the solution, which at the beginning of the reaction is at 12–13, drops to about 7–8. To the light milky reaction mixture, there are then added dropwise 6 parts by volume of glacial acetic acid, then 20 parts of chloro-o-phenylphenol, and then while stirring thoroughly 20 parts by volume of a 30% aqueous caustic soda solution. The precipitated resinous reaction product is separated from the water, washed several times, and dried at 70° under reduced pressure. 22 parts of the so-obtained reaction product are admixed at 90–100° with 3.5 parts by volume of glacial acetic acid, 3.3 parts by volume of an alkylphenolpolyglycol ether, and 11.9 parts by volume of propylene glycol. A viscous product is obtained which dissolves in water, forming a milky emulsion.

Cotton fabric—treated for a half hour at 60–70° with a 0.4% aqueous emulsion of this product in a bath ratio of 1:50 and at a pH of 7.5–8, and then rinsed and dried—has practically 100% tear strength after being buried for three weeks in compost dirt, whereas similar handling of an untreated cotton fabric results in a drop of the tear strength to practically zero.

*Example 3*

13.5 parts of 2,2′-dihydroxy-5,5′-dichlorodiphenylmethane are added to a suspension of 32 parts of the polymeric nitrogen compound, prepared according to Example 1, in 500 parts by volume of acetone. After stirring for two hours at 50°, the reaction product is filtered off with suction and is dried.

0.8 part of the so-obtained reaction product is admixed at 90–100° with 3 parts by volume of propylene glycol and 0.6 part by volume of an alkylphenolpolyglycol ether, after which the resultant mixture is stirred with 500 parts by volume of water at 60° to form a milky emulsion. A cotton fabric—treated with this emulsion for one hour at 60–70° in a bath ratio of 1:50, and then rinsed and dried—contains even after being rinsed for many hours practically all the original quantity of dichlorodihydroxydiphenylmethane. In contradistinction hereto, the dichlorodihydroxydiphenylmethane has substantially entirely disappeared from a cotton fabric—to which the said compound has been applied in the same concentration from an alcoholic solution but which fabric has not otherwise been treated according to the present invention—after only a two-hour rinsing.

*Example 4*

A mixture of 90 parts of dicyandiamide, 90 parts of ammonium chloride, 320 parts by volume of 36.5% aqueous formaldehyde solution and 150 parts by volume of water is boiled for 30 minutes under a reflux condenser, and thereupon is evaporated to dryness under reduced pressure. To the solution of 10 parts of the so-obtained polymeric nitrogen compound in 150 parts by volume of aqueous sodium hydroxide solution with a pH of about 11–12, there is added dropwise at 50° and while stirring a solution of 10 parts of chloro-o-cyclohexanol in 20 parts by volume of acetone. Upon completion of the dropwise addition, stirring is continued for an additional half hour at 50°, and the resultant resinous product separated from the water, washed, and dried at 70° under reduced pressure. One part of the so-obtained reaction product is dissolved in about 3 parts by volume of warm glacial acetic acid and then diluted to 500 parts by volume with water at 60°, whereupon a milky emulsion results, the pH of which is adjusted to 7.5–8 by the addition of ammonia.

Cotton fabric—treated with this emulsion for a half hour at 60–70° in a bath ratio of 1:50, and then rinsed and dried—possesses anti-mold properties of good fastness to wet treatments.

*Example 5*

16 parts of the polymeric nitrogen compound, prepared according to Example 1, are dissolved in 500 parts by volume of water and then stirred at 50° with 3 parts of paraformaldehyde until the presence of formaldehyde in the solution is no longer detectable. Thereupon 21 parts of chloro-o-cyclohexylphenol, dissolved in 25 parts by volume of acetone, are added to the practically clear solution. Upon completion of the said addition, the mixture is stirred for a half hour at 50°, and the resultant resinous reaction product is separated from the water and is dried at 60° under reduced pressure.

One part of the so-obtained reaction product is dissolved in a small quantity of warm glacial acetic acid and then diluted with warm water to 500 parts by volume. The so-obtained, somewhat cloudy solution is adjusted to pH 7.5–8 by means of ammonia. A cotton fabric—treated with the said solution for a half hour at 60–70° in a bath ratio of 1:50, and then rinsed and dried—is protected against attack by mold fungi and this protection is fast to wet treatments.

*Example 6*

290 parts of calcium cyanamide are suspended for 45 minutes in 1400 parts by volume of water at 40°. The suspension is then filtered and the filter cake is washed with 125 parts by volume of water. The filtrate is neutralized with 94–96 parts by volume of dilute aqueous sulfuric acid (1:1), care being taken that the temperature of the mixture does not exceed 35°. The precipitated calcium sulfate is filtered off with suction, and the filter cake is washed with 100–150 parts by volume of water. 162 parts by volume of aqueous formaldehyde (40% vol.) are added to the filtrate, the pH of which is then adjusted to 7.5–7.8 by means of aqueous 30% NaOH solution, whereupon the entire mixture is stirred for 3–4 hours at about 35°. After cooling, the precipitated condensation product is separated by filtration, being, after drying, a yellowish powder which is readily soluble in acids.

10 parts of the so-obtained condensation product are dissolved in 100 parts by volume of acetic acid of about 15% strength, after which 10 parts of chloro-o-cyclohexylphenol are added. The reaction mixture is stirred, while heating to 50°, until the phenol has been thoroughly distributed, after which aqueous caustic soda solution is dropped in until the pH value has risen to about 8. After stirring for an additional half hour at 50°, the precipitated reaction product is filtered off with suction, being, after drying, a light yellow, practically water-insoluble powder having a weak odor.

One part of the so-obtained product is dissolved in 3.5 parts by volume of warm glacial acetic acid and the solution is then diluted to 500 parts by volume with water at 60°. The pH of the thus-obtained emulsion is adjusted to 7.5–8 by the addition of ammonia. A cotton fabric—treated with this emulsion for a half hour at 60–70° in a bath ratio of 1:50, and then rinsed and dried—is endowed with anti-mold properties of good fastness to wet treatments.

*Example 7*

A solution of 5 parts of chloro-o-phenylphenol in 10 parts by volume of acetone is added dropwise at 30–40° and while stirring to an ammoniacal filtered aqueous solution of 15 parts of a polymeric nitrogen compound in 500 parts of water, said polymeric nitrogen compound being obtained by condensing 13.3 parts of ethylene diamine dihydrochloride and 16.8 parts of dicyandiamide for 7 hours at 200°, the pH of the solution being 8 to 9. Upon completion of the dropwise addition, stirring is continued for an additional half hour at 30–40°, after which the precipitated resinous reaction product is separated from the water and is dried at 60° under reduced pressure. 3.0 parts of the so-obtained reaction product are dissolved in 60 parts by volume of ethyl alcohol and then diluted to 1000 parts by volume with water at 60°, whereupon a milky emulsion is formed. A cotton fabric—impregnated with this emulsion for 20 minutes at 60–70° (bath ratio 1:50) and then rinsed and dried—is endowed with mildew-proof properties which are retained even after rinsing.

*Example 8*

15 parts of the polymeric nitrogen compound, prepared by condensing 21.2 parts of diethylenetriamine trihydrochloride and 16.8 parts of dicyandiamide for 7 hours at 200° are dissolved in 200 parts of water which is made alkaline by adding caustic soda. This solution is stirred at 50–55° with 10 parts of a chloro-o-cyclohexylphenol. The precipitated resinous reaction product is separated from the water, washed several times, and dried at 70° under reduced pressure. An emulsion of this product is made by dissolving it in alcohol and adding this solution to water as described in Example 1.

A cotton fabric—treated for half an hour at 60–70° with this emulsion in a bath ratio of 1:50 and at a pH of 7.5–8, and then rinsed and dried—has practically 100% tear strength after being buried for three weeks in compost earth, whereas similar handling of an untreated cotton fabric results in a drop of the tear strength to practically zero.

Similar results may be obtained if 35 parts of the polymeric nitrogen compound cited above are made to a slurry in 35 parts of water to which is added 70 parts of formaldehyde 40% by volume and refluxed for 30 minutes till a clear solution is obtained and if this solution is evaporated to dryness under reduced pressure and if the so-obtained residue is used instead of the initial polymeric nitrogen compound which has not been treated with formaldehyde.

The term "a phenol" in the foregoing refers to all phenols having a fungicidal and/or bactericidal activity, and, in addition to the already specifically mentioned phenols, also includes phenols such as monophenylphenol, monocyclohexylphenol, monobenzylphenol, mono-, di-, tri-, tetra-, and penta-chlorophenol, mono-, di-, tri- and tetra-chloro-cresol, mono-, di- and tri-chloro-xylenol, derivatives of salicylic acid such as the anilide, bis-(2-hydroxy-3,5-dichlorophenyl)sulfide.

Having thus disclosed the invention, what is claimed is:

1. A method of protecting cellulose fibers against microorganisms and molds, which comprises impregnating the said fibers with an impregnant consisting of the product of the reaction of a chlorinated phenol which contains free phenolic hydroxyl and has fungicidal or bactericidal activity with a polymeric nitrogen compound which has affinity for cellulose fibers and is selected from the group consisting of condensation products obtained by (a) condensing dicyandiamide with diethylenetriamine with splitting off of ammonia, (b) condensing dicyandiamide with diethylenetriamine with splitting off of ammonia and then reacting the product with benzyl chloride, and (c) condensing dicyandiamide with diethylenetriamine with splitting off of ammonia and then reacting the product with formaldehyde.

2. A process according to claim 1, wherein the impregnant is applied in the form of an aqueous dispersion.

3. Impregnated cellulose fibers obtained according to claim 1.

4. A method of protecting cellulose fibers against microorganisms and molds, which comprises impregnating the said fibers with an impregnant consisting of the product of the reaction of a chlorinated phenol which contains free phenolic hydroxyl and has fungicidal or bactericidal activity with a polymeric nitrogen compound which has affinity for cellulose fibers and is obtained by condensing dicyandiamide with diethylenetriamine with splitting off of ammonia.

5. A method of protecting cellulose fibers against microorganisms and molds, which comprises impregnating the said fibers with an impregnant consisting of the product of the reaction of a chlorinated phenol which contains free phenolic hydroxyl and has fungicidal or bactericidal activity with a polymeric nitrogen compound which has affinity for cellulose fibers and is obtained by condensing dicyandiamide with diethylenetriamine with splitting off of ammonia and then reacting the product with benzyl chloride.

6. A method of protecting cellulose fibers against microorganisms and molds, which comprises impregnating the said fibers with an impregnant consisting of the product of the reaction of a chlorinated phenol which contains free phenolic hydroxyl and has fungicidal or bactericidal activity with a polymeric nitrogen compound which has affinity for cellulose fibers and is obtained by condensing dicyandiamide with diethylenetriamine with splitting off of ammonia and then reacting the product with formaldehyde.

References Cited in the file of this patent

UNITED STATES PATENTS

| 2,260,967 | Bruson | Oct. 28, 1941 |
| 2,446,864 | Abrams | Aug. 10, 1948 |
| 2,513,429 | Rosher | July 4, 1950 |

FOREIGN PATENTS

| 740,863 | Germany | Oct. 29, 1943 |